Oct. 28, 1941.   W. E. NAYLOR   2,260,476
FILM CLIP
Filed Nov. 19, 1940
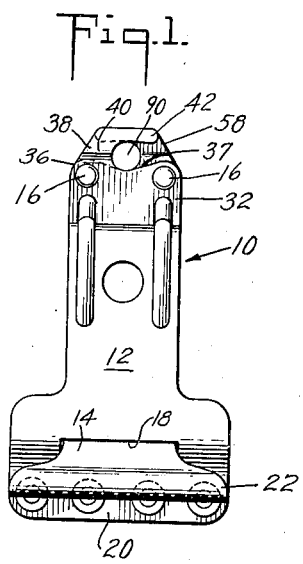
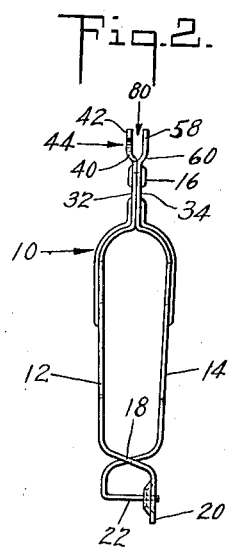
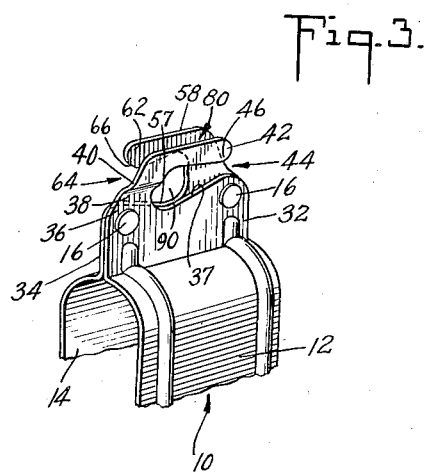
INVENTOR
WILLIAM E. NAYLOR
BY
W. R. Liberman
ATTORNEY Patented Oct. 28, 1941

2,260,476

UNITED STATES PATENT OFFICE 2,260,476

FILM CLIP

William E. Naylor, Ridgefield Park, N. J., assignor to Fink-Roselieve Co., Inc., New York, N. Y., a corporation of New York Application November 19, 1940, Serial No. 366,228

3 Claims. (Cl. 24—236)

My invention relates generally to film clips and specifically relates to means on and a part of the clip whereby the same may be easily threaded or hung onto a generally elongated support such as a wire, nail or the like. While my invention, for purposes of illustration, will be described in relation to a film clip, same obviously has a much broader application and is to be limited only by the scope of the claims appended hereto.

The main object of my invention is the provision of a device which can easily, simply and quickly be locked onto and removed from a thin, elongated support such as a wire, nail, string or the like.

Another object of my invention is the provision of a locking device which is adapted to receive a generally elongated support therewithin and be locked thereupon by a twist or turn of the device of about ninety degrees.

Another object of my invention is the provision of a device having a channeled top and an opening therethrough at right angles to the channel, the channel and opening being in communication.

Another object of my invention is the provision of a device having a channeled top lengthwise thereof opening upwardly of the device, and an opening at right angles to the channel, the opening having a passageway in from each side of the device, the channel and opening being in communication.

Another object of my invention is the provision of a device having a channel in the top thereof into which the support is passed and an opening at right angles to the channel into which the support may be received and onto which the device is locked.

A further object of my invention is the provision of a device of the character described which has a pair of upstanding side-slotted wing members spaced apart to define a channel therebetween, the slots and channel cooperating to form a locking means.

A further object of my invention is the provision of a device of the character described in which the body portion has a pair of fingers extending upwardly therefrom on diagonally opposite sides thereof, which fingers are angled inwardly towards each other in parallel and spaced relation to define a channel therebetween, with the leading ends of the fingers bent over at an angle to the stems thereof to define a pair of opposing slots, the slots being in communication with the channel and opening inwardly from opposite ends of the device.

Other objects of my invention will be specifically pointed out hereinbelow in connection with the description of an illustrative embodiment thereof, and other objects will in part be obvious.

In the drawing annexed hereto and made a part hereof,

Figure 1 is a front elevational view of one form of clip device constructed according to and embodying my invention;

Fig. 2 is a side elevational view thereof; and

Fig. 3 is an enlarged perspective view of the suspending means.

Reference numeral 10 indicates the film clip of my invention generally, which comprises a pair of body members 12 and 14 of spring sheet metal, which may be riveted, spot-welded or otherwise secured together at one end thereof, as at 16, 16. Body members 12 and 14 are entwined as at 18, and the leading ends 20 and 22 thereof respectively are fabricated to form coacting socket and tooth portions respectively. This general construction is and has long been conventional in the art (see the U. S. patents to Dye, No. 1,373,493, dated April 5, 1921, and Pleiss, No. 2,169,073, dated August 8, 1939), and needs no further amplification, except to point out that by the application of pressure on the body portions 12 and 14, urging same toward each other, the tooth and body portions of my clip may be separated to permit the insertion of the film or picture or other article to be held thereby.

Body portions 12 and 14 have flat plate portions 32, 34 respectively thereon at the upper portions thereof which lie flatly against each other and through which the rivets, bolts or other fasteners 16, 16 are passed to secure together the body portions. At one end 36 of plate 32, there is provided a finger 38 (which may be integral—as shown—with the plate 32), the stem portion of which finger extends upwardly of plate 32 and is angled outwardly as at 40. The leading end 42 of finger 38 is bent over in line with the outwardly angled stem to define a lateral slot 44 between body 37 of plate 32 and the underside of finger 42 opening inwardly from one side of the device. The leading end 42 of finger 38 is slightly enlarged, as at 46, and the upper edge 37 of plate 32 is angled downwardly toward finger 38 so that the width of slot 44 increases in from the mouth thereof.

Slot 44 extends upwardly from the side of the device past the center line thereof.

At the other end of plate 34, diagonally opposite from end 36 of plate 32, there is provided a finger 58 (which may also—as shown—be integral with plate 34) the stem portion of which finger 58 extends upwardly of plate 34 (parallel to the stem portion of finger 38), and is angled outwardly as at 60. The leading end 62 of finger 58 is bent over in line with the outwardly angled stem to define a lateral slot 64 between body 57 of plate 34 and the underside of finger 62 in from the side of the device opposite to the opening into slot 44. The leading ends 42, 62 of fingers 38, 58 respectively are parallel to each other and spaced apart to form a channel 80 therebetween extending lengthwise of the device, and opening upwardly thereof. The leading end 62 of finger 58 is also slightly enlarged, as at 66, and the upper edge 57 of plate 34 is angled downwardly towards finger 58, so that the width of slot 64, as does the width of slot 44, increases in from the mouth thereof. Slot 64 similarly with slot 44 extends inwardly from the side of the device past the center line thereof, and slots 44 and 64 overlap as seen in Fig. 1 to define an opening 90 extending through the device, which opening 90 is at right angles to and in communication with the channel 80.

My device will function best when used with a long, narrow support as a wire, rope, nail, etc., and is used in the following manner: The channel 80 in the upper portion is moved towards the support and in line therewith with the support being received lengthwise within the channel and between the sides thereof. If the finger ends 42, 62 are bent over from left to right, as illustrated, a quarter turn clockwise will bring the device into such position that the support is received within and passes through channel 90, and is locked by the enlarged ends of fingers 42, 62 against accidental dislodgment. If the finger ends are bent over from the right to left, the locking quarter turn must be counter-clockwise. To unlock or remove the clip from the support, the quarter turn is reversed, the support brought into longitudinal alignment with the channel 80, and the device lowered away.

For locking purposes, my device will function with any support which is narrower than channel 80 and longer than the distance from the side to the center of opening 90.

Having described my invention, what I claim and desire to secure by Letters Patent is:

1. A device of the character described having a body portion, and a pair of spaced apart wing members extending upwardly on opposite sides thereof defining an open channel therebetween, said wing members having finger extensions from diagonally opposite sides of each of said wings extending inwardly of the device in spaced parallel relation to each other to form a pair of spaced apart and slotted opposing hook members.

2. A device as in claim 1, in which the slots in the opposing hook members open inwardly from opposite sides of the device, past the center thereof, defining an opening through the device and in communication with the channel.

3. A device of the character described, comprising a pair of flat plate members secured together, said plates having a pair of upwardly extending opposed wing portions spaced apart in parallel relationship to define an open channel therebetween, each of said wing members being side-slotted inwardly from opposite sides thereof to form finger portions and to define an opening through the device, which opening is at an angle to the channel and is in communication therewith.

WILLIAM E. NAYLOR.